United States Patent
Srivastava

(10) Patent No.: US 7,181,014 B1
(45) Date of Patent: Feb. 20, 2007

(54) PROCESSING METHOD FOR KEY EXCHANGE AMONG BROADCAST OR MULTICAST GROUPS THAT PROVIDES A MORE EFFICIENT SUBSTITUTE FOR DIFFIE-HELLMAN KEY EXCHANGE

(75) Inventor: Sunil K. Srivastava, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 10/715,721

(22) Filed: Nov. 17, 2003

Related U.S. Application Data

(63) Continuation of application No. 09/393,411, filed on Sep. 10, 1999, now abandoned.

(51) Int. Cl.
*H04L 9/00* (2006.01)
*H04L 9/32* (2006.01)

(52) U.S. Cl. .................. 380/278; 713/163; 713/168

(58) Field of Classification Search .............. 380/28, 380/30, 278, 277; 713/162, 163, 201, 168
See application file for complete search history.

(56) References Cited

U.S. PATENT DOCUMENTS

| | | | |
|---|---|---|---|
| 4,200,770 A | 4/1980 | Hellman et al. | 380/30 |
| 4,531,020 A | 7/1985 | Wechselberger et al. | 380/329 |
| 4,578,531 A | 3/1986 | Everhart et al. | 38/282 |
| 4,776,011 A | 10/1988 | Busby | 380/37 |
| 4,881,263 A | 11/1989 | Herbison et al. | 713/62 |
| 5,309,516 A | 5/1994 | Takaragi et al. | 380/45 |
| 5,351,295 A | 9/1994 | Perlman et al. | 713/162 |
| 5,361,256 A | 11/1994 | Doeringer et al. | 370/390 |
| 5,491,750 A * | 2/1996 | Bellare et al. | 713/155 |
| 5,588,060 A * | 12/1996 | Aziz | 380/30 |
| 5,588,061 A | 12/1996 | Ganesan et al. | 380/30 |

(Continued)

FOREIGN PATENT DOCUMENTS

EP  0 952 718 A2  10/1999

(Continued)

OTHER PUBLICATIONS

Office Action from U.S. Appl. No. 09/393,411 (cover page and Office Action Summary), filed Nov. 6, 2003, 2 pages.

(Continued)

*Primary Examiner*—Ayaz Sheikh
*Assistant Examiner*—Christian LaForgia
(74) *Attorney, Agent, or Firm*—Hickman Palermo Truong & Becker LLP

(57) ABSTRACT

An approach for arriving at a shared secret key in a multicast or broadcast group environment is disclosed. The key exchange protocol permits nodes within a multicast or broadcast group to compute a shared secret key in a binary fashion, whereby a shared secret key is generated for a pair of nodes at a time. Once the shared secret key is computed by the pair, the nodes within the pair are viewed as a single entity by a node that is to be joined. This process is iteratively performed until all the nodes within the multicast group attain a common shared secret key. Under this approach, the number of messages exchanged between the nodes for establishing the secured channel is significantly reduced.

34 Claims, 7 Drawing Sheets

U.S. PATENT DOCUMENTS

| | | | |
|---|---|---|---|
| 5,600,642 A | 2/1997 | Pauwels et al. | 370/396 |
| 5,630,184 A | 5/1997 | Roper et al. | 709/221 |
| 5,633,933 A * | 5/1997 | Aziz | 380/30 |
| 5,663,896 A | 9/1997 | Aucsmith | 713/201 |
| 5,666,415 A * | 9/1997 | Kaufman | 713/159 |
| 5,668,877 A * | 9/1997 | Aziz | 380/30 |
| 5,724,425 A | 3/1998 | Chang et al. | 705/52 |
| 5,748,736 A | 5/1998 | Mittra | 713/163 |
| 5,761,305 A | 6/1998 | Vanstone et al. | 713/171 |
| 5,805,578 A | 9/1998 | Stirpe et al. | 370/255 |
| 5,832,229 A | 11/1998 | Tomoda et al. | |
| 5,841,864 A | 11/1998 | Klayman et al. | 713/171 |
| 5,850,451 A | 12/1998 | Sudia | 380/286 |
| 5,889,865 A | 3/1999 | Vanstone et al. | 713/171 |
| 5,920,630 A | 7/1999 | Wertheimer et al. | 380/286 |
| 5,987,131 A | 11/1999 | Clapp | 713/171 |
| 6,009,274 A | 12/1999 | Fletcher et al. | 717/173 |
| 6,026,167 A * | 2/2000 | Aziz | 380/28 |
| 6,049,878 A * | 4/2000 | Caronni et al. | 713/201 |
| 6,055,575 A | 4/2000 | Paulsen et al. | 709/229 |
| 6,088,336 A | 7/2000 | Tosey | 370/255 |
| 6,091,820 A * | 7/2000 | Aziz | 380/30 |
| 6,119,228 A | 9/2000 | Angelo et al. | 713/180 |
| 6,151,395 A | 11/2000 | Harkins | 380/286 |
| 6,216,231 B1 | 4/2001 | Stubblebine | 713/201 |
| 6,226,383 B1 | 5/2001 | Jablon | 380/30 |
| 6,240,188 B1 | 5/2001 | Dondeti et al. | 380/284 |
| 6,240,513 B1 | 5/2001 | Friedman et al. | |
| 6,247,014 B1 | 6/2001 | Ladwig et al. | |
| 6,256,733 B1 | 7/2001 | Thakkar et al. | 713/156 |
| 6,263,435 B1 | 7/2001 | Dondeti et al. | 713/163 |
| 6,272,135 B1 | 8/2001 | Nakatsugawa | 370/390 |
| 6,279,112 B1 | 8/2001 | O'Toole, Jr. et al. | 713/201 |
| 6,295,361 B1 * | 9/2001 | Kadansky et al. | 380/278 |
| 6,330,671 B1 * | 12/2001 | Aziz | 713/163 |
| 6,332,163 B1 | 12/2001 | Bowman-Amuah | 709/231 |
| 6,363,154 B1 | 3/2002 | Peyravian et al. | 380/283 |
| 6,483,921 B1 | 11/2002 | Harkins | 380/286 |
| 6,507,562 B1 | 1/2003 | Kadansky et al. | 370/216 |
| 6,570,847 B1 | 5/2003 | Hosein | |
| 6,584,566 B1 * | 6/2003 | Hardjono | 713/163 |
| 6,606,706 B1 * | 8/2003 | Li | 713/162 |
| 6,629,243 B1 * | 9/2003 | Kleinman et al. | 713/163 |
| 6,633,579 B1 | 10/2003 | Tedijanto et al. | 370/432 |
| 6,636,968 B1 | 10/2003 | Rosner et al. | |
| 6,643,773 B1 | 11/2003 | Hardjono | 713/153 |
| 6,684,331 B1 * | 1/2004 | Srivastava | 713/163 |
| 6,745,243 B2 | 6/2004 | Squire et al. | 709/227 |
| 6,782,475 B1 | 8/2004 | Sumner | |
| 6,785,809 B1 * | 8/2004 | Hardjono | 713/163 |
| 6,901,510 B1 * | 5/2005 | Srivastava | 713/163 |
| 6,917,685 B1 * | 7/2005 | Watanabe et al. | 380/262 |
| 6,987,855 B1 * | 1/2006 | Srivastava | 380/278 |
| 2003/0044017 A1 | 3/2003 | Briscoe | |

FOREIGN PATENT DOCUMENTS

EP 0 994 600 A2 4/2000

OTHER PUBLICATIONS

Office Action from U.S. Appl. No. 09/393,411 (cover page and Office Action Summary), filed Sep. 8, 2003, 2 pages.
Office Action from U.S. Appl. No. 09/393,410 (cover page and Office Action Summary), filed Nov. 7, 2003, 2 pages.
Office Action from U.S. Appl. No. 09/393,410 (cover page and Office Action Summary), filed Sep. 3, 2003, 2 pages.
Office Action from U.S. Appl. No. 09/608,831 (cover page and Office Action Summary), filed Feb. 9, 2004, 2 pages.
Whitfield Diffie, et al., "New Directions in Cryptography," IEEE Transactions On Information Theory, vol. IT-22, No. 6, Nov. 1976, pp. 29-40.
Whitfield Diffie, "The First Ten Years of Public-Key Cryptography," Proceedings of the IEEE, vol. 76, No. 5, May 1988, pp. 560-577.
Silvio Micali, "Guaranteed Partial Key-Escrow", MIT/LCS/TM-537, Laboratory for Computer Science, Aug. 1995, Handout #13, 14 pages.
Mihir Bellare, et al., "Verifiable Partial Key Escrow," Proceedings of the Fouth Annual Conference on Computer and Communications Security, ACM, 1997 Nov. 1996, pp. 1-22.
U.S. Department of Commerce, National Institute of Standards and Technology, Federal Information Processing Standards Publication 185 Feb. 9, 1994, 8 pages.
Cylink Corporation, "Alternatives to RSA: Using Diffie-Hellman with DSS," 11 pages.
Robert Orfali et al., "The Essential Distributed Objects Survival Guide," 1996, pp. 448-449.
David Chappell, "Understanding Microsoft Windows 2000 Distributed Services," 2000, pp. 319-324.
Robert Orfali et al., "Client/Server Survival Guide Third Edition," 1999, p. 488.
Koblitz, Neal, A Course in Number Theory and Cryptography, 1994, Springer-Verlag New York Inc. 2nd Edition, 8 pages.
Alfred J. Menezes, "Handbook of Applied Cryptography," 1997, CRC Press LLC., pp. 519-520.
Bruce Schneier, "Applied Cryptography," 1996, John Wiley & Sons, Inc., pp. 33-35 and 47-65.
Harry Newton, Newton's Telecom Dictionary, 1998, Telecom Books, 14th Edition, p. 228.

* cited by examiner

US 7,181,014 B1

PROCESSING METHOD FOR KEY EXCHANGE AMONG BROADCAST OR MULTICAST GROUPS THAT PROVIDES A MORE EFFICIENT SUBSTITUTE FOR DIFFIE-HELLMAN KEY EXCHANGE

RELATED APPLICATION

The present application is a continuation of and claims priority to U.S. patent application Ser. No. 09/393,411, "PROCESSING METHOD FOR KEY EXCHANGE AMONG BROADCAST OR MULTICAST GROUPS THAT PROVIDES A MORE EFFICIENT SUBSTITUTE FOR DIFFIE-HELLMAN KEY EXCHANGE" by Sunil K. Srivastava, which was filed on Sep. 10, 1999 now abandoned, and is incorporated by reference herein.

The present application is related to U.S. patent application Ser. No. 09/608,831, "Establishing A Shared Secret Key Over A Broadcast Channel" by Srinath Gundavelli and David McNamee, which was filed on Jun. 30, 2000.

FIELD OF THE INVENTION

The invention relates to cryptographic communication systems, and more specifically, to a key exchange approach for providing secure communication among broadcast or multicast groups in a communications network.

BACKGROUND OF THE INVENTION

The proliferation of network computing has shaped how society transacts business andengages in personal communication. As reliance on computer networks grows, the flow of information between computers continues to increase in dramatic fashion. Accompanying this increased flow of information is a proportionate concern for network security. Commercial users, who regularly conduct business involving the exchange of confidential or company proprietary information over their computer networks, demand that such information is secure against interception by an unauthorized party or susceptible to corruption. In addition, with the acceptance of such applications as electronic commerce over the global Internet, all users recognize the critical role cryptographic systems play in maintaining the integrity of network communication.

The goal of cryptography is to keep messages secure. A message can be defined as information or data that is arranged or formatted in a particular way. In general, a message, sometimes referred to as "plaintext" or "cleartext", is encrypted or transformed using a cipher to create "ciphertext," which disguises the message in such a way as to hide its substance. In the context of cryptography, a cipher is a mathematical function that can be computed by a data processor. Once received by the intended recipient, the ciphertext is decrypted to convert the ciphertext back into plaintext. Ideally, ciphertext sufficiently disguises a message in such a way that even if the ciphertext is obtained by an unintended recipient, the substance of the message cannot be discerned from the ciphertext.

Many different encryption/decryption approaches for protecting information exist. In general, the selection of an encryption/decryption scheme depends upon considerations such as the types of communications to be made more secure, the particular parameters of the network environment in which the security is to be implemented, and the desired level of security. Since the level of security often has a direct effect on system resources, an important consideration is the particular system on which a security scheme is to be implemented.

For example, for small applications that require a relatively low level of security, a traditional restricted algorithm approach may be appropriate. With a restricted algorithm approach, a group of participants agree to use a specific, predetermined algorithm to encrypt and decrypt messages exchanged among the participants. Because the algorithm is maintained in secret, a relatively simple algorithm may be used. However, if the secrecy of the algorithm is compromised, the algorithm must be changed to preserve secure communication among the participants.

Scalability, under this approach, is a problem. As the number of participants increases, keeping the algorithm secret and updating it when compromises occur place an undue strain on network resources. In addition, standard algorithms cannot be used since each group of participants must have their own unique algorithm.

To address the shortcomings of traditional restricted algorithm approaches, many contemporary cryptography approaches use a key-based algorithm. Generally two types of key-based algorithms exist: symmetric algorithms; and asymmetric algorithms, of which one example is a public key algorithm. In a key-based algorithm, a key forms one of the inputs to a mathematical function that a computer or processor uses to generate a ciphertext.

Public key algorithms are designed so that the key used for encryption is different than the key used for decryption. The decryption key cannot be determined from the encryption key, at least not in any reasonable amount of time with practical computing resources. Typically, the encryption key (public key) is made public so that anyone, including an eavesdropper, can use the public key to encrypt a message. Only a specific participant in possession of the decryption key (private key) can decrypt the message.

Public key algorithms, however, often are not employed as a mechanism to encrypt messages largely because such algorithms consume an inordinate amount of system resources and time to encrypt entire messages. Further, public key encryption systems are vulnerable to chosen-plaintext attacks, particularly when there are relatively few possible encrypted messages.

As a result, a public key cryptosystem is utilized to establish a secure data communication channel through key exchanges among the participants. Two or more parties, who wish to communicate over a secure channel, exchange or make available to each other public (or non-secure) key values. Each party uses the other party's public key value to privately and securely compute a private key, using an agreed-upon algorithm. The parties then use their derived private keys in a separate encryption algorithm to encrypt messages passed over the data communication channel. Conventionally, these private keys are valid only on a per communication session basis, and thus, are referred to as session keys. These session keys can be used to encrypt/decrypt a specified number of messages or for a specified period of time.

A typical scenario involves exchanging a message between two users, or participants, A and B. User A is considered a publisher of a message to a subscriber, user B. The public key algorithm used to establish a secure channel between publisher, A, and subscriber, B, is as follows:

1. B provides a public key, B, to A.
2. A generates a random session key SK, encrypts it using public key B and sends it to B.
3. B decrypts the message using private key, b (to recover the session key SK).
4. Both A and B use the session key SK to encrypt their communications with each other.

The above approach provides the added security of destroying the session key at the end of a session, thereby providing greater protection against eavesdroppers.

A known public key exchange method is the Diffie-Hellman method described in U.S. Pat. No. 4,200,770. The Diffie-Hellman method relies on the difficulty associated with calculating discrete logarithms in a finite field. According to this method, two participants, A and B, each select random large numbers a and b, which are kept secret. A and B also agree (publicly) upon a base number p and a large prime number q, such that p is primitive mod q. A and B exchange the values of p and q over a non-secure channel or publish them in a database that both can access. Then A and B each privately compute public keys A and B, respectively, as follows:

$$A \text{ privately computes a public key A as: } A=p^a \bmod (q) \quad (1)$$

$$B \text{ privately computes a public key B as: } B=p^b \bmod (q) \quad (2)$$

A and B then exchange or publish their respective public keys A and B and determine private keys $k_a$ and $k_b$ as follows:

$$A \text{ computes a private key } k_a \text{ as: } k_a=B^a \bmod (q) \quad (3)$$

$$B \text{ computes a private key } k_b \text{ as: } k_b=A^b \bmod (q) \quad (4)$$

As evident from equation (3), A's private key is a function of its own private random number, a, and the public key, B. Likewise, equation (4) indicates that B's private key depends on its own private number, b, and the public key of A. As it turns out, A and B arrive at the shared secret key based upon the following:

$$k_a=B^a \bmod (q) \text{ and } k_b=A^b \bmod (q)$$

Substituting for A and B using equations (1) and (2) above yields:

$$k_a=(p^b \bmod (q))^a \bmod (q) \text{ and } k_b=(p^a \bmod (q))^b \bmod (q)$$

$$k=p^{ba} \bmod (q) \text{ and } k_b=p^{ab} \bmod (q)$$

Therefore, $k_a=k_b$.

Using the Diffie-Hellman protocol, A and B each possesses the same secure key $k_a$, $k_b$, which can then be used to encrypt messages to each other. An eavesdropper who intercepts an encrypted message can recover it only by knowing the private values, a or b, or by solving an extremely difficult discrete logarithm to yield a or b. Thus, the Diffie-Hellman protocol provides a relatively secure approach.

FIG. 6 shows a broadcast version of the Diffie-Hellman method involving three clients, nodes or users A, B, C. Although three users are shown as an example, any number of clients, nodes or users may participate in the same approach.

Initially, each of the participants A, B, and C randomly generates private integers, a, b, and c, respectively. Thereafter, they compute their public keys, as in block 601, as follows:

$$A=p^a \bmod (q) \quad (5)$$

$$B=p^b \bmod (q) \quad (6)$$

$$C=p^c \bmod (q) \quad (7).$$

Next, in block 603, user A sends message $C'=C^a \bmod (q)$ to user B. In turn, B transmits the message, $A'=A^b \bmod (q)$ to C, per block 605. User C sends A, as in block 607, the message $B'=B^c \bmod (q)$. Lastly, the users arrive at a shared secret key, k, by computing the following:

$$A \text{ computes k: } k=B'^a \bmod (q)=p^{abc} \bmod (q) \quad (8)$$

$$B \text{ computes k: } k=C'^b \bmod (q)=p^{abc} \bmod (q) \quad (9)$$

$$C \text{ computes k: } k=A'^c \bmod (q)=p^{abc} \bmod (q) \quad (10)$$

When it is used in a network environment comprising a plurality of network nodes, the Diffie-Hellman key-exchange algorithm requires N×(N−1) rounds of point-to-point unicast messages between logically adjacent member nodes. With three nodes, as in this instance, there are 6 total messages exchanged as each member node communicates its public key to the other members of the group. As the number of multicast group members grows, this method of key-exchange requires extensive message traffic and may introduce appreciable system delay.

One approach for improving the efficiency of public key exchange is presented in co-pending application Ser. No. 09/393,410, filed on the same date as this application, by the same named inventor, and entitled "OPERATIONAL OPTIMIZATION OF A SHARED SECRET DIFFIE-HELLMAN KEY EXCHANGE AMONG BROADCAST OR MULTICAST GROUPS." This approach operationally optimizes key exchange and permits nodes in a network to carry out public key exchange using far fewer messages than the number of messages required in the Diffie-Hellman approach. However, an approach using a different computational method still is desirable.

Based upon the foregoing, there is a clear need for improved approaches to key exchange that minimize network processing delays, especially among broadcast or multicast group members in a network.

In particular, there is an acute need for an improved approach to enhance scalability.

Other needs and objects will become apparent from the following description.

Based on the need to provide secure communication while limiting the adverse effects on system resources and the limitations in the prior approaches, an approach for providing secure communication that provides a relatively high level of security while requiring relatively fewer system resources and time to perform is highly desirable.

SUMMARY OF THE INVENTION

The foregoing needs and objects, and other needs and objects that may become apparent from the following description, are fulfilled by the present invention, which comprises, in one aspect, a method for establishing a secure communication session among a first node of a network and one or more other nodes using a group shared secret key, each of the nodes having a private key value associated therewith. The method may comprise communicating a first public key value of the first node to a second node; creating and storing an initial shared secret key for the first node and second node based on a first private key value and a second public key value that is received from the second node; creating and storing information at the first node that associates the first node with a first network communication entity by generating a collective public key value that is shared by the first node and a second node and based on the first private key value and a second private key value that is derived by the first node from the second public key value; receiving a third public key value from a third node that seeks to join the first network communication entity; creating and storing a shared secret key value based on the collective public key value and the third public key value; joining the first node to a second network communication entity that includes the first network communication entity and the third node and that uses secure communication with messages that are encrypted using the shared secret key value.

In one feature, joining the first node to a second network communication entity includes the step of communicating the first private key value to the second node and to the third node using messages encrypted using the shared secret key value. In another feature, creating and storing a shared secret key value further comprises creating and storing the shared secret key based upon how many times each node of the second network communication entity has participated in formation of any such entity and based upon each private number of each node in the second network communication entity.

According to another feature, creating and storing a subsequent shared secret key for use by the first network communication entity and the third node to enable the third node to independently compute the group shared secret key. In another feature, creating and storing the subsequent shared secret key comprises creating and storing the subsequent shared secret key, k, according to the relation $$k=p^{(a*x)(b*y)(c*z)} \mod (q)$$

where p=a random number, q=a prime number, a=the first private key value, b=the second private key value, c=a private key value of the third node, x=a number of times the first node has participated in entity formation, y=a number of times the second node has participated in entity formation, and z=a number of times the third node has participated in entity formation.

Yet another feature involves storing and distributing the first public value and the second public value using a key distribution center. According to still another feature, joining the first node to a second network communication entity further comprises creating and storing a collective public key based upon the first private key value, the second private key value, and the third private key value; and communicating a collective public key of the second network communication entity to the third node.

In another feature, joining the first node to a second network communication entity further comprises determining which one of the nodes of the first network communication entity is designated to transfer the collective public key based upon order of entry into the formed entity. A related feature is that joining the first node to a second network communication entity further comprises determining which one of the nodes of the first network communication entity is designated to transfer the collective public key based upon a predetermined metric.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

As will become apparent, an approach for key exchange based upon a public key algorithm, such as the Diffie-Hellman protocol, is optimized to enhance operation in terms of speed of processing as well as scaling of a multicast or broadcast group. Authentication and authorization are orthogonal to exchanging messages in a secret way with a third party. Having third party endorsed key-based signed messages helps tackle the repudiation problem.

The basic public key encryption approach is for a group of participants to publish their public keys, for example, in a database and maintain their own private keys. These participants can access the database to retrieve the public key of the participant to whom they want to send a message and use it to encrypt a message destined for that participant. Unfortunately, the database, even if secure, is vulnerable to key substitution during transmission of the keys. This problem is alleviated by using a trusted intermediary that has the responsibility of distributing the stored public keys to the multicast or broadcast group members. The trusted intermediary is a third party, trusted authentication authority. When Kerberos key exchange is used for authentication, the trusted intermediary may be implemented as a Key Distribution Center (KDC). When public key infrastructure is used, the trusted intermediary may be a Certificate Authority (CA).

The KDC or other trusted intermediary distributes the stored public keys to the multicast or broadcast group members by encrypting the public keys with its own private key, which is shared with each of the group members. The group members then decipher the encrypted message to determine each others' public keys.

Figure 1:
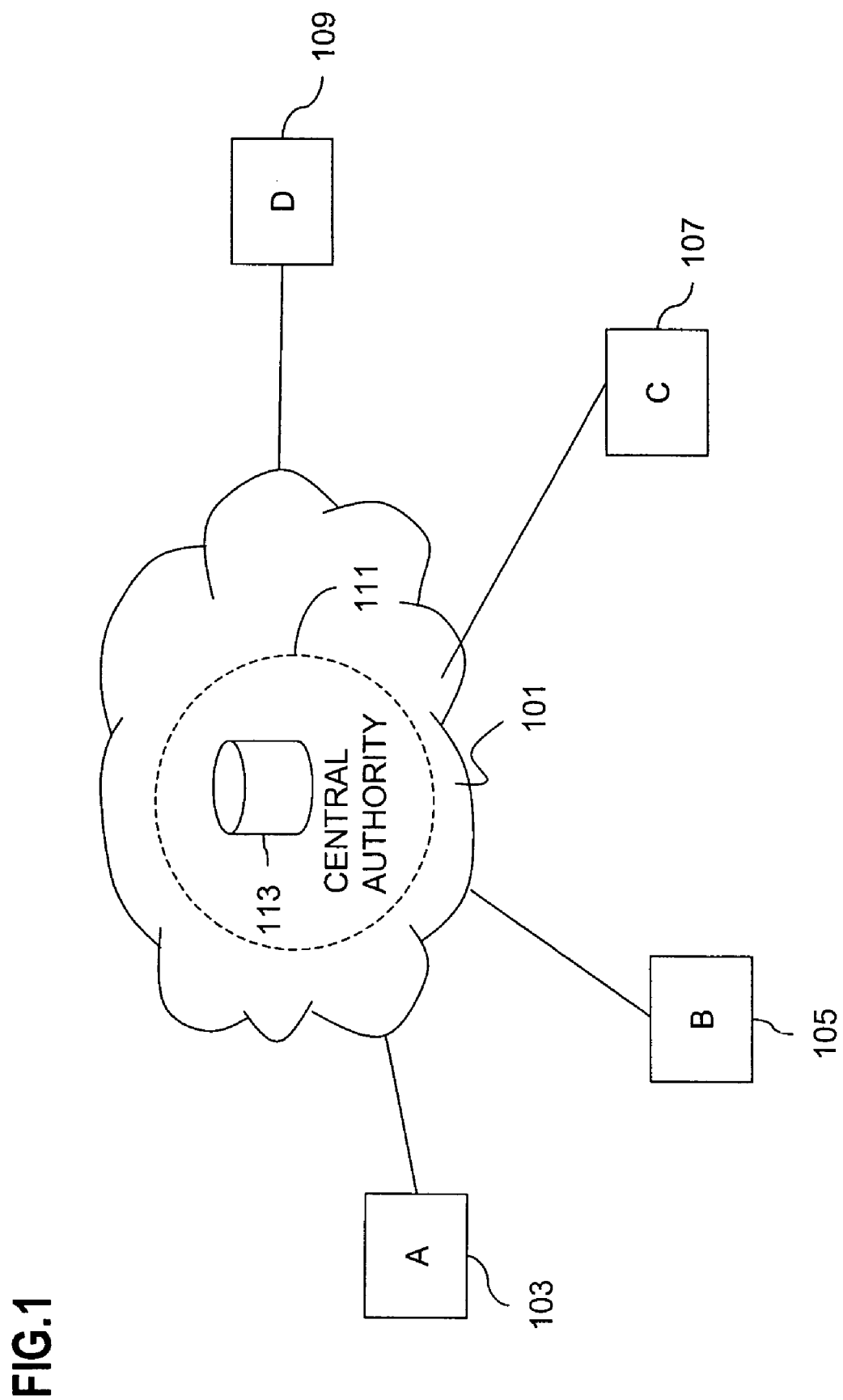
FIG. 1 is a block diagram of a secure communication system employing a central authority in the form of a key distribution center (KDC).

FIG. 1 shows an exemplary implementation with four users A, B, C, and D connected via network 101. The network 101 may be a packet switched network, which supports the Internet Protocol (IP). A Central Authority 111, which is a third party trusted authentication authority, is hosted in network 101. In a preferred embodiment, Central Authority 111 is a multicast subnetwork made up of multiple KDCs interconnected over secured channels in a hierarchical relationship. Among other functions, the Central Authority 111 provides authentication and validation services when individual nodes join the multicast or broadcast group. Although four (4) users A, B, C, D are shown as an example, any number of users or nodes can be used.

Central Authority 111 may be a KDC subnetwork in an environment that uses an exchange of Kerberos credentials for communications security. However, any other suitable central authority mechanism may be substituted. For example, a certificate authority (CA) may be used as Central Authority 111 when a public key infrastructure (PKI) is used for communications security in the network.

In an exemplary embodiment, a distributed directory provides the services of the Central Authority 111. In general, directory technology creates active associations among the users, applications, and the network. A directory is a logically centralized, highly distributed data repository, which can be accessed by the applications. The distributed architecture is achieved by replicating data across multiple directory servers strategically located throughout the network. Directories can represent network elements, services, and policies to enable ease of network administration and security. In particular, a directory can supply authentication services, whereby all users, applications, and network devices can authenticate themselves through a common scheme. One type of directory within contemplation of the present invention is Active Directory from Microsoft Corporation. The directory may be an X.500 directory or an LDAP-compatible directory.

In the system of FIG. 1, a directory may contain user account or security principal information for authenticating users or services along with the shared secret key between the members A, B, C, and D and the directory. In one embodiment, such information is stored in a database 113, which can reside within each KDC or is shared among two or more KDCs. Users A, B, C, and D authenticate themselves using the security services of the directory. Further, some of the directories can serve as a certificate authority (CA), or work cooperatively with CAs. In should be noted that the secured channels within the Central Authority 111 can be established using the key exchange method of the present invention, which is discussed below with respect to FIG. 3, FIG. 4A, and FIG. 4B.

According to an alternative embodiment, a centralized KDC approach may be utilized whereby the Central Authority 111 comprises a single KDC that serves each of the workstations 103, 105, 107, 109 of users A, B, C, D, respectively. In the centralized case, the KDC utilizes point-to-point communication with each group member or user A, B, C, D to authenticate them. Central Authority 111 uses database 113 for storing the public key values of all the participants.

Figure 2:
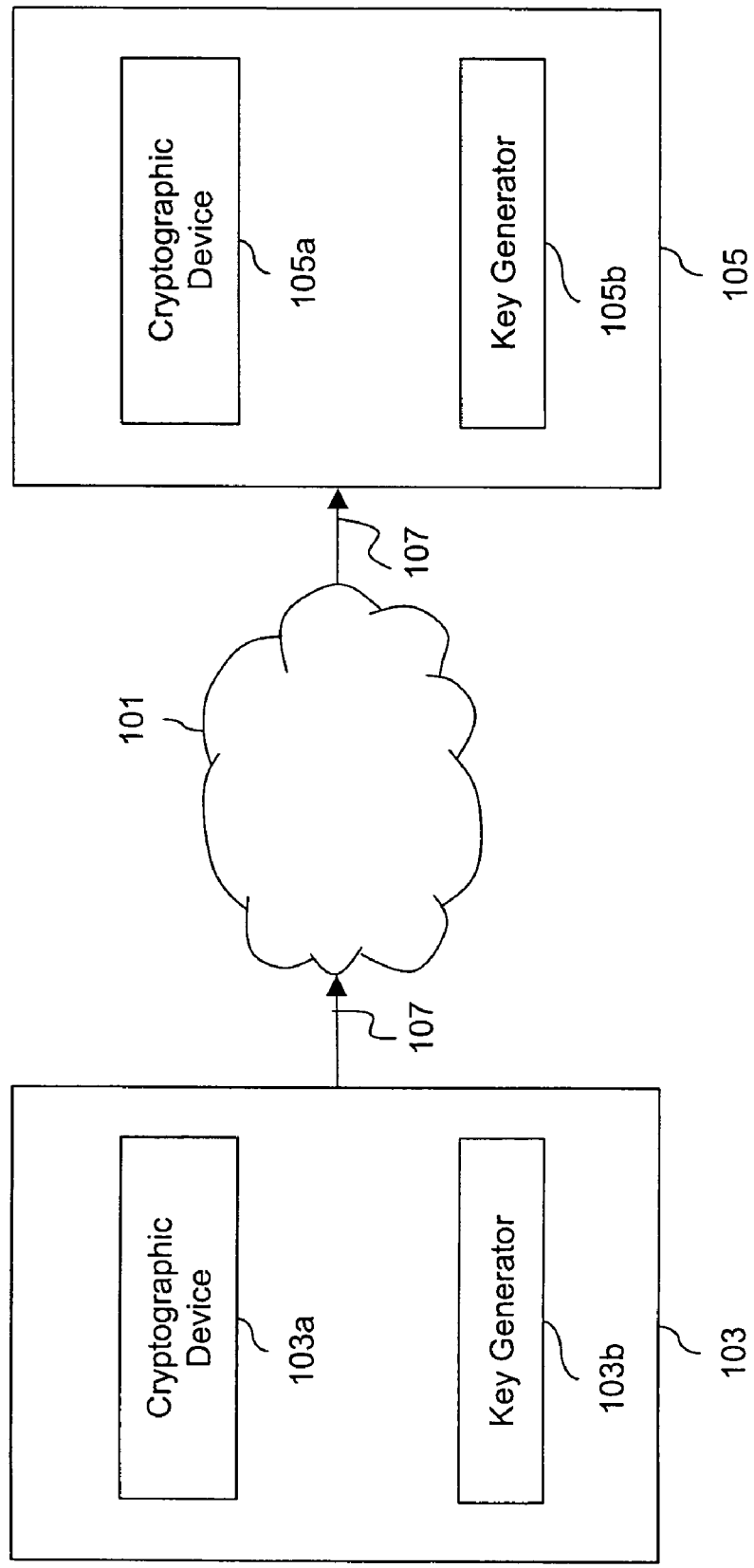
FIG. 2 is a block diagram illustrating the security mechanisms for providing secure communication between two participants in the system of FIG. 1.

FIG. 2 illustrates a secured communication system 201 with which two participants A and B to arrive at a shared secret key value, according to an embodiment of the present invention. Two participants are shown as an example, however, any number of users, clients, or nodes may be used. User A employing workstation 103 communicates with another workstation 105 of user B over a communication link 107. Link 107 is established over the network 101. Network 101 may be a local area network (LAN), a wide area network (WAN), the global packet-switched network known as the Internet, a wireless transmission medium, or any other medium for exchanging information between the participants. In addition, link 107 may be non-secure, thereby allowing third party access to information transmitted by the link 107. Alternatively, link 107 may be secure.

As seen in the exemplary embodiment of FIG. 2, workstations 103, 105 have complementary functional elements. Workstation 103 (user A) includes a key generator 103b and a cryptographic device 103a. Key generator 103b generates public and private keys used for encrypting and decrypting information exchanged with workstation 105 (user B). Cryptographic device 103a encrypts and decrypts information exchanged with workstation 105 using private and public keys generated by key generator 103b. Similarly, workstation 105 includes a key generator 105b and a cryptographic device 105a. Key generator 105b supplies public and private keys that are used to establish a secured link 107 with workstation 103. Information that are exchanged with workstation 103 are encrypted and decrypted by cryptographic device 105a using private and public keys generated by key generator 105b.

Participants 103, 105 use the Diffie-Hellman method to exchange their keys. Using this approach, these participants 103, 105 can securely exchange information over link 107 using a public key exchange protocol. An eavesdropper, having access to ciphertext transmitted on link 107, cannot feasibly decrypt the encrypted information.

Figure 3:
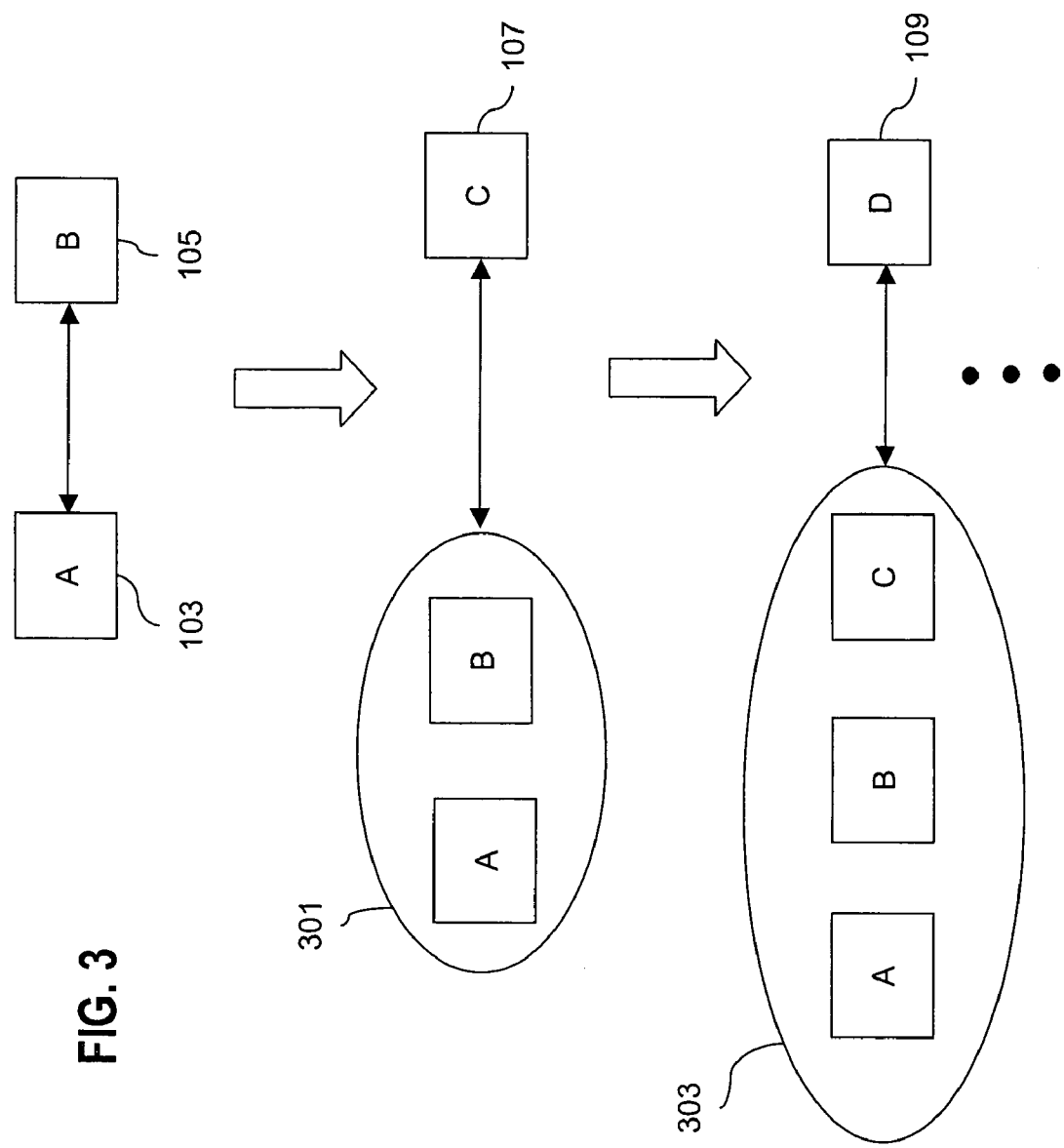
FIG. 3 is a diagram of the operation of a key exchange method.

As the number of participants in a multicast or broadcast group increases beyond two, the standard broadcast version of Diffie-Hellman begins to introduce greater delays in establishing the secured channel. As shown in FIG. 3, a public key exchange protocol, which in the preferred embodiment is based mathematically on the Diffie-Hellman method discussed above, addresses two nodes at a time. In this example, a multicast group comprises users A, B, C of the network of FIG. 1. Initially, users A, B use their respective workstations 103, 105 to establish a common shared secret key to securely communicate between themselves. Conceptually, users A, B form a single entity 301. A subsequent user or node seeking to join the multicast group effectively views the previously formed multicast group as a single unit. Hence, users A, B are treated as a single entity with respect to arriving at a new shared secret key with a new group member. Only one user, A or B, needs to communicate with the new multicast group member, user C.

In the preferred embodiment, the user who last joins the multicast group is designated as the node that relays the group's information to the new user. The current multicast group (entity 301) has only two users A, B, because B can be considered as joining with A, B is the designated node. Alternatively, the designated node can be determined according to physical proximity or other metrics (e.g., telecommunication cost, reliability, link utilization, etc.) to the new node. Once entity 301 and user C arrive at a new shared secret key, they form a new entity 303, constituting a new multicast group that subsumes multicast group 301.

If user D wishes to join the multicast group, only one of the users among A, B, C needs to share the group's public value ("collective key"). Because user C was the last member to join, it forwards the group's public value to user D, who may then compute the shared secret key based on the collective key. This "binary" approach of coming to a shared secret key between two entities at a time, as further described with respect to FIG. 4A and FIG. 4B, results in a reduced number of messages exchanged among the group members over the standard broadcast Diffie-Hellman approach.

Figure 4A:
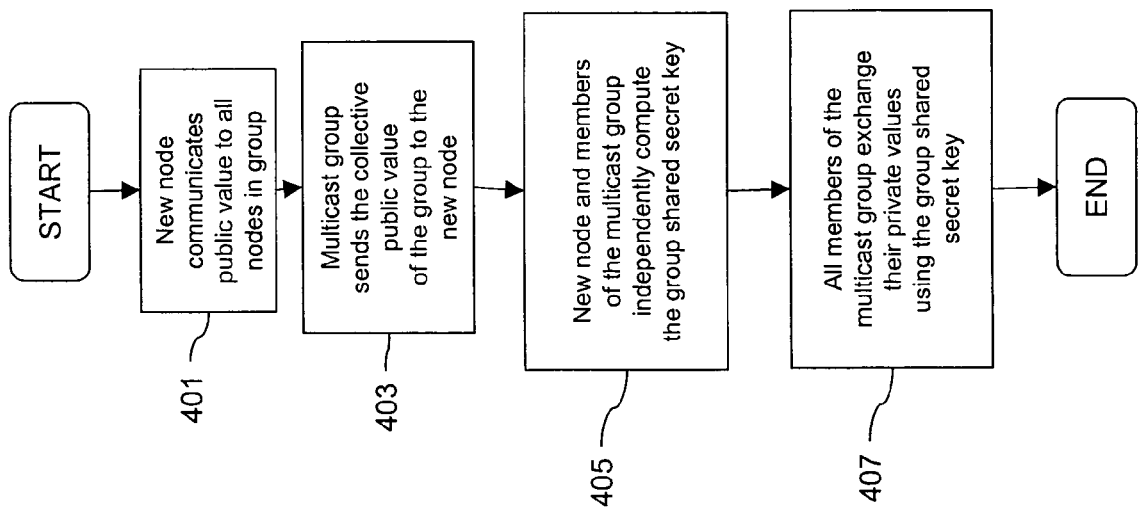
FIG. 4A is a flow diagram illustrating an overview of a method for key exchange.

FIG. 4A is a flow diagram providing an overview of a binary approach. Assume that a multicast group of nodes or users is in existence. This multicast group may consist of a single node or any number of nodes. If two or more nodes made up the multicast group, a further assumption is made that the group is communicating over a secure channel. Thus, each member of the multicast group possesses or has knowledge of a group shared secret key.

In block 401, a new node wishes to join the existing multicast group and initiates this process by communicating the new node's public value to all other nodes in the multicast group. In an exemplary embodiment, a directory provides this service by storing the public value for ready access by the members of the multicast group.

The multicast group sends the new node the collective public value of the multicast group, as shown in block 403. The computation of this public value is more fully discussed below in FIG. 4B. Based upon each other's public key, the new node and the multicast group members independently compute a new group shared secret key, as indicated by block 405. With this new group shared secret key, all members of the new multicast group can exchange their private values, as shown by block 407. Accordingly, secure communication can be achieved.

Figure 4B:
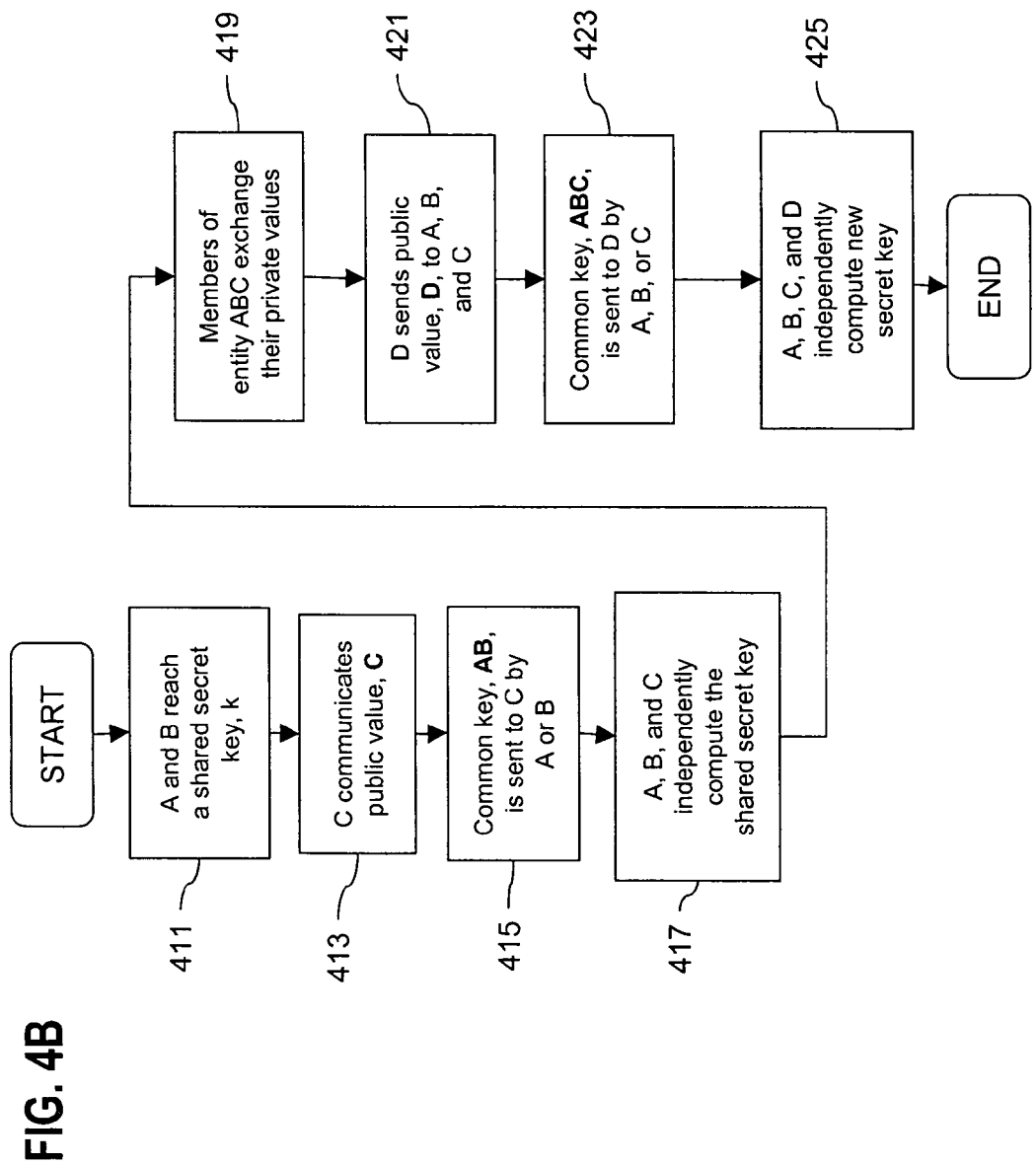
FIG. 4B is a flow diagram illustrating further steps in the method of FIG. 4A.

FIG. 4B provides an illustrative example of this process in greater detail. In FIG. 4B, a flow chart shows the operation of a key exchange protocol to arrive at a shared secret key in accordance to an exemplary embodiment involving four nodes, users A, B, C, D.

In block 411, A and B each compute a shared secret key, $k=p^{ab}$ mod (q), thereby forming entity 301. Thus, block 411 may involve forming entity 301 in a manner similar to the standard two party Diffie-Hellman method discussed herein. A and B each publishes its respective public key (A=pa mod (q) and B=$p^b$ mod (q)). User A obtains B's public key to compute B a mod (q), which equals $p^{ab}$ mod (q); in turn, user B performs a similar computation based on A's public key. Once A and B have reached a shared secret key, they exchange their private numbers, a and b.

Numbers a and b are randomly generated integers and are embedded in messages that are sent by users A and B to each other. These messages can be signed by the sending node using a private key that differs from the sending node's private number. In one embodiment, the private key may be a permanent private key; by using separate private keys, the multicast group obtains an additional level of security.

Currently, the multicast group includes users A and B; however, user C has a message to multicast to both A and B. As a result C seeks to join the multicast group. In block 413, user C broadcasts its public value, C=$p^c$ mod (q), to the other users, A, B, within the established multicast group. Next, as in block 415, a public key value, AB, determined by users A and B, is sent to user C by either A or B.

$$AB = k_{ab}^{ab} \text{ mod } (q) = p^{(ab)(ab)} \text{ mod } (q) \quad (11)$$

As shown in Equation 11, the private number of the formed entity or multicast group AB is the product of the individual private numbers a and b, raised to a power that is function of the number of nodes within the formed entity. Thus, the private value of AB is $(ab)^2$.

As earlier discussed, in the preferred embodiment, the last member to join the group has the responsibility of transferring the collective public key value to a "joining" node. Thus, user B transmits public key, AB, to C. At the time of joining the multicast group, the new member C has knowledge of only one entity. As noted previously, the entity may be a single node or multiple nodes; in this case, A and B are considered one entity. Thereafter, A and B independently compute the shared secret, as shown by block 417, as follows:

$$k_{abc} = C^{(ab)(ab)} \text{ mod } (q) = p^{(ab)(ab)c} \text{ mod } (q) = p^{(ab**2)c} \text{ mod } (q) \quad (12)$$

Users A, B are able to compute the shared secret key because they know each other's randomly generated private numbers a, b. Equation 12 shows that this computation, operationally, can be accomplished by tracking the number of times each of the nodes has undergone multicast membership joins. In this instance, users A, B have been involved with multicast joins twice, while user C has done so only once.

User C computes the group shared secret key according to Equation 13:

$$k_{abc} = (AB)^c \text{ mod } (q) = p^{(ab)(ab)c} \text{ mod } (q) = p^{(ab**2)c} \text{ mod } (q) \quad (13)$$

Now that a group shared secret key has been computed by all the members of the "new" multicast group, the members exchange their private values to begin communicating over a secure channel, as shown by block 419.

Another user D now wants to communicate with all the users of the multicast group. User D, thus, is required to broadcast its public value, D (=$p^d$ mod (q)) to the multicast group, as shown by block 421. The multicast group, in block 423, transfers an agreed upon collective public value, ABC, to D. According to one embodiment, C is designated as the member to convey this public value, ABC, to user D. The public value is:

$$ABC = k_{abc}^{abc} \text{ mod } (q) = p^{(((ab)(ab)c)(abc))} \text{ mod } (q) = p^{(ab3)(c2)} \text{ mod } q \quad (14)$$

Based on Equation (14), the private value for the multicast group is $(ab)^3(c^2)$. Thus, the private value is the product of the private values of the nodes raised to the number of times each node has been in group formations. This approach is computationally advantageous because the collective public key can be derived by simply having each node track the number of times it has participated in multicast group formation. With this information, in block 425 user D, as the new node, computes a new group shared secret key, $k_{abcd}$:

$$k_{abcd} = (ABC)^d \text{ mod } (q) = p^{(((ab)(ab)c)(abc)d} \text{ mod } (q) = p^{(ab3)(c2)d} \text{ mod } (q) \quad (15)$$

Likewise, the other members of the multicast group (i.e., users A, B, and C) calculate the new group shared secret key.

The above protocol advantageously requires only 2n+2 (n-1) messages, where n is the round of iteration of exchanging messages between two entities. Noting that 2 nodes are combined in the first round and 3 nodes in the second round, the number of messages may be expressed as:

2(N-1)+2(N-1-1)=4N-6 messages, where N is the number of nodes in the multicast or broadcast group. The standard broadcast version of Diffie-Hellman requires N(N-1) or $N^2$+N messages. Thus, with an increase in the number of nodes, the standard Diffie-Hellman approach grows exponentially, while the present approach follows a linear progression. Operationally the present approach is more efficient but provides the same level of security.

In the preferred embodiment, the processes shown in FIG. 3, FIG. 4A, and FIG. 4B may be implemented as one or more computer-executed instructions, processes, programs, subroutines, functions, or their equivalents. In an embodiment, each workstation 103, 105, 107, 109 is a general-purpose computer of the type shown in FIG. 5 and described herein in connection with FIG. 3, FIG. 4A and FIG. 4B. The cryptographic devices 103*a*, 105*a* and the key generators 103*b*, 105*b* are one or more computer-executed instructions, processes, programs, subroutines, functions, or their equivalents. Further, embodiments may be implemented as discrete hardware circuitry, a plurality of computer instructions (computer software), or a combination of discrete hardware circuitry and computer instructions.

Figure 5:
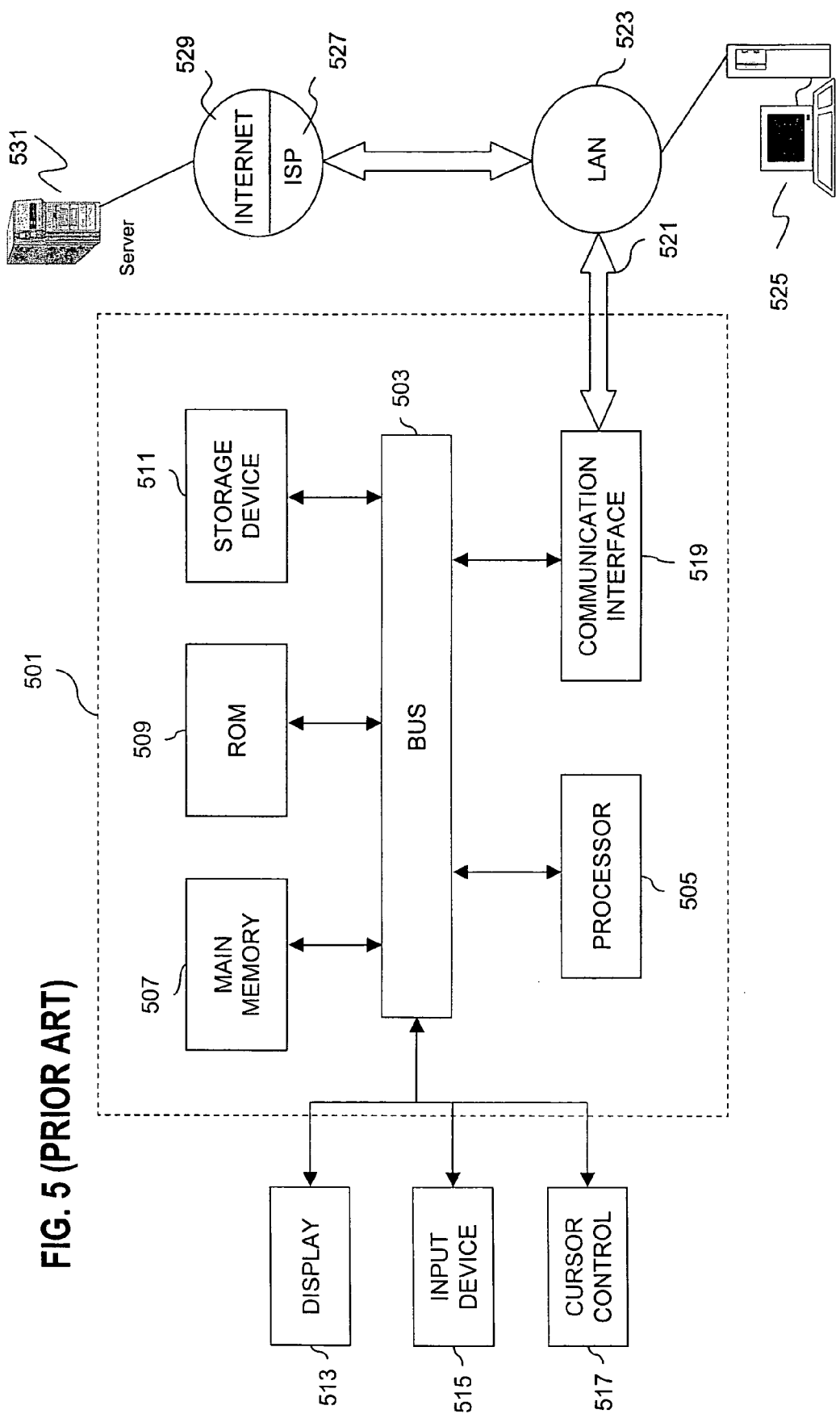
FIG. 5 is a block diagram of a computer system on which embodiments may be implemented.
Figure 6:
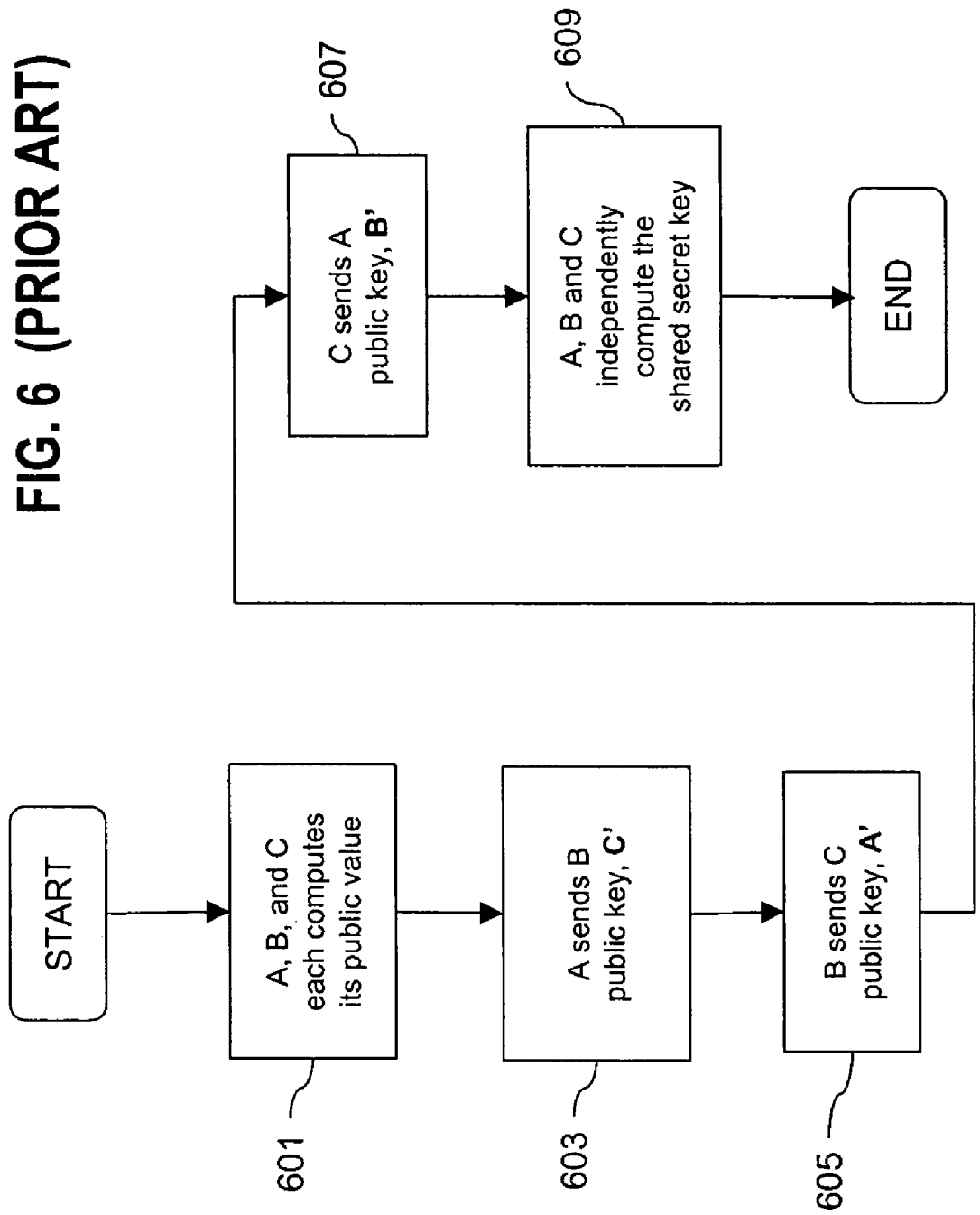
FIG. 6 is a flow chart showing a conventional broadcast Diffie-Hellman method of key exchange.

FIG. 5 illustrates a computer system 501 upon which an embodiment according to the present invention may be implemented. Computer system 501 includes a bus 503 or other communication mechanism for communicating information, and a processor 505 coupled with bus 503 for processing the information. Computer system 501 also includes a main memory 507, such as a random access memory (RAM) or other dynamic storage device, coupled to bus 503 for storing information and instructions to be executed by processor 505. In addition, main memory 507 may be used for storing temporary variables or other intermediate information during execution of instructions to be executed by processor 505. Notably, the values associated with tracking the number of times a node engages in multicast group formation may be stored in main memory 507. Computer system 501 further includes a read only memory (ROM) 509 or other static storage device coupled to bus 503 for storing static information and instructions for processor 505. A storage device 511, such as a magnetic disk or optical disk, is provided and coupled to bus 503 for storing information and instructions.

Computer system 501 may be coupled via bus 503 to a display 513, such as a cathode ray tube (CRT), for displaying information to a computer user. An input device 515, including alphanumeric and other keys, is coupled to bus 503 for communicating information and command selections to processor 505. Another type of user input device is cursor control 517, such as a mouse, a trackball, or cursor direction keys for communicating direction information and command selections to processor 505 and for controlling cursor movement on display 513.

Embodiments are related to the use of computer system 501 to implement a public key exchange encryption approach for securely exchanging data between participants. According to one embodiment, the public key exchange encryption approach is provided by computer system 501 in response to processor 505 executing one or more sequences of one or more instructions contained in main memory 507. Such instructions may be read into main memory 507 from another computer-readable medium, such as storage device 511. Execution of the sequences of instructions contained in main memory 507 causes processor 505 to perform the process steps described herein. One or more processors in a multi-processing arrangement may also be employed to execute the sequences of instructions contained in main memory 507. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 511. Volatile media includes dynamic memory, such as main memory 507. Transmission media includes coaxial cables, copper wire and fiber optics, including the wires that comprise bus 503. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions relating to computation of the shared secret key into its dynamic memory and send the instructions over a telephone line using a modem. A modem local to computer system 501 can receive the data on the telephone line and use an infrared transmitter to convert the data to an infrared signal. An infrared detector coupled to bus 503 can receive the data carried in the infrared signal and place the data on bus 503. Bus 503 carries the data to main memory 507, from which processor 505 retrieves and executes the instructions. The instructions received by main memory 507 may optionally be stored on storage device 511 either before or after execution by processor 505.

Computer system 501 also includes a communication interface 519 coupled to bus 503. Communication interface 519 provides a two-way data communication coupling to a network link 521 that is connected to a local network 523. For example, communication interface 519 may be a network interface card to attach to any packet switched local area network (LAN). As another example, communication interface 519 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 519 sends and receives electrical, electromagnetic or optical signals that carry digital data streams representing various types of information.

Network link 521 typically provides data communication through one or more networks to other data devices. For example, network link 521 may provide a connection through local network 523 to a host computer 525 or to data equipment operated by an Internet Service Provider (ISP) 527. ISP 527 in turn provides data communication services through the Internet 529. Local network 523 and Internet 529 both use electrical, electromagnetic or optical signals that carry digital data streams. The signals through the various networks and the signals on network link 521 and through communication interface 519, which carry the digital data to and from computer system 501, are exemplary forms of carrier waves transporting the information.

Computer system 501 can send messages and receive data, including program code, through the network(s), network link 521 and communication interface 519. In the Internet example, a server 531 might transmit a requested code for an application program through Internet 529, ISP 527, local network 523 and communication interface 519.

One such downloaded application provides a public key exchange encryption approach for securely exchanging data between participants as described herein.

The received code may be executed by processor 505 as it is received, and/or stored in storage device 511, or other non-volatile storage for later execution. In this manner, computer system 501 may obtain application code in the form of a carrier wave.

The techniques described herein provide several advantages over prior public key exchange encryption approaches for securely exchanging data among multiple participants. Because the number of messages required for the key exchange is reduced, network latency correspondingly decreases. Further, the multicast or broadcast group exhibits improved scalability.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for establishing a secure communication session among a first node of a network and one or more other nodes using a group shared secret key, each of the nodes having a private key value associated therewith, the method comprising the computer-implemented steps of:
    communicating a first public key value of the first node to a second node;
    creating and storing an initial shared secret key for the first node and second node based on a first private key value and a second public key value that is received from the second node;
    creating and storing information at the first node that associates the first node with a first network communication entity by generating a collective public key value that is shared by the first node and a second node and based on the first private key value and a second private key value that is derived by the first node from the second public key value;
    receiving a third public key value from a third node that seeks to join the first network communication entity;
    creating a second shared secret key value based on the collective public key value and the third public key value; and
    joining the first node to a second network communication entity that includes the first network communication entity and the third node and that uses secure communication with messages that are encrypted using the second shared secret key value;
    wherein the first node, second node, and third node are separate nodes.

2. A method as recited in claim 1, wherein joining the first node to a second network communication entity includes the step of communicating the first private key value to the second node and to the third node using messages encrypted using the second shared secret key value.

3. A method as recited in claim 1, wherein creating the second shared secret key value further comprises creating and storing the second shared secret key based upon how many times each node of the second network communication entity has participated in formation of any such entity and based upon each private number of each node in the second network communication entity.

4. A method as recited in claim 1, further comprising the step of creating and storing a subsequent shared secret key for use by the first network communication entity and the third node to enable the third node to independently compute the group shared secret key.

5. A method as recited in claim 4, wherein creating and storing the subsequent shared secret key comprises creating and storing the subsequent shared secret key, k, according to the relation $$k=p^{(a*x)(b*y)(c*z)} \bmod (q)$$

where p=a random number, q=a prime number, a=the first private key value, b=the second private key value, c=a private key value of the third node, x=a number of times the first node has participated in entity formation, y=a number of times the second node has participated in entity formation, and z=a number of times the third node has participated in entity formation.

6. A method as recited in claim 5, further comprising the step of storing and distributing the first public value and the second public value using a key distribution center.

7. A method as recited in claim 5, wherein the step of joining the first node to a second network communication entity further comprises:
    creating and storing a collective public key based upon the first private key value, the second private key value, and the third private key value;
    communicating a collective public key of the second network communication entity to the third node.

8. A method as recited in claim 7, wherein the step of joining the first node to a second network communication entity further comprises determining which one of the nodes of the first network communication entity is designated to transfer the collective public key based upon order of entry into the formed entity.

9. A method as recited in claim 7, wherein the step of joining the first node to a second network communication entity further comprises determining which one of the nodes of the first network communication entity is designated to transfer the collective public key based upon a predetermined metric.

10. A method as recited in claim 1, wherein creating and storing an initial shared secret key for the first node and second node comprises creating and storing an initial shared public key "AB" according to the relation $$AB=k_{ab}^{ab} \bmod (q)=p^{(ab)(ab)} \bmod (q)$$

wherein k=the initial shared secret key value, a=the first private key value, b=the second private key value, p is a base value, and q is a randomly generated prime number value.

11. A method as recited in claim 1, wherein creating and storing the second shared secret key value further comprises creating and storing the second shared secret key according to the relation $$k_{abc}=(AB)^c \bmod (q)=p^{(ab)(ab)c} \bmod (q)=p^{(ab**2)c} \bmod (q)$$

where p=a random number, q=a prime number, a=the first private key value, b=the second private key value, c=a private key value of the third node, AB=the collective public key value.

12. A computer-readable storage medium carrying one or more sequences of one or more instructions for establishing a secure communication session among a first node of a network and one or more other nodes using a group shared secret key, each of the nodes having a private key value associated therewith, the one or more sequences of one or more instructions including instructions which, when executed by one or more processors, cause the one or more processors to perform the steps of:

communicating a first public key value of the first node to a second node;

creating and storing an initial shared secret key for the first node and second node based on a first private key value and a second public key value that is received from the second node;

creating and storing information at the first node that associates the first node with a first network communication entity by generating a collective public key value that is shared by the first node and a second node and based on the first private key value and a second private key value that is derived by the first node from the second public key value;

receiving a third public key value from a third node that seeks to join the first network communication entity;

creating a second shared secret key value based on the collective public key value and the third public key value; and joining the first node to a second network communication entity that includes the first network communication entity and the third node and that uses secure communication with messages that are encrypted using the second shared secret key value;

wherein the first node, second node, and third node are separate nodes.

13. A multicast communication server for establishing a secure communication session among a first node of a network and one or more other nodes using a group shared secret key, each of the nodes having a private key value associated therewith, comprising:

means for communicating a first public key value of the first node to a second node;

means for creating and storing an initial shared secret key for the first node and second node based on a first private key value and a second public key value that is received from the second node;

means for creating and storing information at the first node that associates the first node with a first network communication entity by generating a collective public key value that is shared by the first node and a second node and based on the first private key value and a second private key value that is derived by the first node from the second public key value;

means for receiving a third public key value from a third node that seeks to join the first network communication entity;

means for creating a second shared secret key value based on the collective public key value and the third public key value;

means for joining the first node to a second network communication entity that includes the first network communication entity and the third node and that uses secure communication with messages that are encrypted using the second shared secret key value;

wherein the first node, second node, and third node are separate nodes.

14. The multicast communication server in claim 13, wherein the means for joining the first node to a second network communication entity includes means for communicating the first private key value to the second node and to the third node using messages encrypted using the second shared secret key value.

15. The multicast communication server in claim 13, wherein the means for creating the second shared secret key value further comprises means for creating and storing the second shared secret key based upon how many times each node of the second network communication entity has participated in formation of any such entity and based upon each private number of each node in the second network communication entity.

16. The multicast communication server in claim 13, further comprising means for creating and storing a subsequent shared secret key for use by the first network communication entity and the third node to enable the third node to independently compute the group shared secret key.

17. The multicast communication server in claim 16, wherein the means for creating and storing the subsequent shared secret key comprises means for creating and storing the subsequent shared secret key, k, according to the relation $$k = p^{(a*x)(b*y)(c*z)} \bmod (q)$$

where p=a random number, q=a prime number, a=the first private key value, b=the second private key value, c=a private key value of the third node, x=a number of times the first node has participated in entity formation, y=a number of times the second node has participated in entity formation, and z=a number of times the third node has participated in entity formation.

18. The multicast communication server in claim 17, further comprising means for storing and distributing the first public value and the second public value using a key distribution center.

19. The multicast communication server in claim 17, wherein the means for joining the first node to a second network communication entity further comprises:

means for creating and storing a collective public key based upon the first private key value, the second private key value, and the third private key value;

means for communicating a collective public key of the second network communication entity to the third node.

20. The multicast communication server in claim 19, wherein the means for joining the first node to a second network communication entity further comprises means for determining which one of the nodes of the first network communication entity is designated to transfer the collective public key based upon order of entry into the formed entity.

21. The multicast communication server in claim 19, wherein the means for joining the first node to a second network communication entity further comprises means for determining which one of the nodes of the first network communication entity is designated to transfer the collective public key based upon a predetermined metric.

22. The multicast communication server in claim 13, wherein the means for creating and storing an initial shared secret key for the first node and second node comprises means for creating and storing an initial shared public key "AB" according to the relation $$AB = k_{ab}{}^{ab} \bmod (q) = p^{(ab)(ab)} \bmod (q)$$

wherein k=the initial shared secret key value, a=the first private key value, b=the second private key value, p is a base value, and q is a randomly generated prime number value.

23. The multicast communication server in claim 13, wherein the means for creating and storing the second shared secret key value further comprises means for creating and storing the second shared secret key according to the relation $$k_{abc} = (AB)^c \bmod (q) = p^{(ab)(ab)c} \bmod (q) = p^{(ab**2)c} \bmod (q)$$

where p=a random number, q=a prime number, a=the first private key value, b=the second private key value, c=a private key value of the third node, AB=the collective public key value.

24. An apparatus for establishing a secure communication session among a first node of a network and one or more other nodes using a group shared secret key, each of the nodes having a private key value associated therewith, comprising:

one or more processors;

a computer-readable storage medium carrying one or more sequences of one or more instructions, the one or more sequences of one or more instructions including instructions which, when executed by the one or more processors, cause the one or more processors to perform the steps of:

communicating a first public key value of the first node to a second node;

creating and storing an initial shared secret key for the first node and second node based on a first private key value and a second public key value that is received from the second node;

creating and storing information at the first node that associates the first node with a first network communication entity by generating a collective public key value that is shared by the first node and a second node and based on the first private key value and a second private key value that is derived by the first node from the second public key value;

receiving a third public key value from a third node that seeks to join the first network communication entity;

creating a second shared secret key value based on the collective public key value and the third public key value;

joining the first node to a second network communication entity that includes the first network communication entity and the third node and that uses secure communication with messages that are encrypted using the second shared secret key value;

wherein the first node, second node, and third node are separate nodes.

25. An apparatus as recited in claim 24, wherein the step of joining the first node to a second network communication entity includes the step of communicating the first private key value to the second node and to the third node using messages encrypted using the second shared secret key value.

26. An apparatus as recited in claim 24, wherein the step of creating the second shared secret key value further comprises creating and storing the second shared secret key based upon how many times each node of the second network communication entity has participated in formation of any such entity and based upon each private number of each node in the second network communication entity.

27. An apparatus as recited in claim 24, the one or more sequences of one or more instructions including instructions which, when executed by the one or more processors, cause the one or more processors to further perform the step of creating and storing a subsequent shared secret key for use by the first network communication entity and the third node to enable the third node to independently compute the group shared secret key.

28. An apparatus as recited in claim 27, wherein creating and storing the subsequent shared secret key comprises creating and storing the subsequent shared secret key, k, according to the relation $$k = p^{(a*x)(b*y)(c*z)} \bmod (q)$$

where p=a random number, q=a prime number, a=the first private key value, b=the second private key value, c=a private key value of the third node, x=a number of times the first node has participated in entity formation, y=a number of times the second node has participated in entity formation, and z=a number of times the third node has participated in entity formation.

29. An apparatus as recited in claim 28, the one or more sequences of one or more instructions including instructions which, when executed by the one or more processors, cause the one or more processors to further perform the step of storing and distributing the first public value and the second public value using a key distribution center.

30. An apparatus as recited in claim 28, wherein the step of joining the first node to a second network communication entity further comprises:

creating and storing a collective public key based upon the first private key value, the second private key value, and the third private key value;

communicating a collective public key of the second network communication entity to the third node.

31. An apparatus as recited in claim 30, wherein the step of joining the first node to a second network communication entity further comprises determining which one of the nodes of the first network communication entity is designated to transfer the collective public key based upon order of entry into the formed entity.

32. An apparatus as recited in claim 30, wherein the step of joining the first node to a second network communication entity further comprises determining which one of the nodes of the first network communication entity is designated to transfer the collective public key based upon a predetermined metric.

33. An apparatus as recited in claim 24, wherein creating and storing an initial shared secret key for the first node and second node comprises creating and storing an initial shared public key "AB" according to the relation $$AB = k_{ab}{}^{ab} \bmod (q) = p^{(ab)(ab)} \bmod (q)$$

wherein k=the initial shared secret key value, a=the first private key value, b=the second private key value, p is a base value, and q is a randomly generated prime number value.

34. An apparatus as recited in claim 24, wherein creating and storing the second shared secret key value further comprises creating and storing the second shared secret key according to the relation $$k_{abc} = (AB)^c \bmod (q) = p^{(ab)(ab)c} \bmod (q) = p^{(ab**2)c} \bmod (q)$$

where p=a random number, q=a prime number, a=the first private key value, b=the second private key value, c=a private key value of the third node, AB=the collective public key value.

* * * * *